US006769074B2

(12) United States Patent
Vaitzblit

(10) Patent No.: US 6,769,074 B2
(45) Date of Patent: Jul. 27, 2004

(54) SYSTEM AND METHOD FOR TRANSACTION-SELECTIVE ROLLBACK RECONSTRUCTION OF DATABASE OBJECTS

(75) Inventor: Lev Vaitzblit, Concord, MA (US)

(73) Assignee: Lumigent Technologies, Inc., Concord, MA (US)

( * ) Notice: Subject to any disclaimer, the term of this patent is extended or adjusted under 35 U.S.C. 154(b) by 592 days.

(21) Appl. No.: 09/861,830

(22) Filed: May 21, 2001

(65) Prior Publication Data

US 2002/0007363 A1 Jan. 17, 2002

Related U.S. Application Data

(60) Provisional application No. 60/207,006, filed on May 25, 2000.

(51) Int. Cl.[7] .................................................. G06F 11/00
(52) U.S. Cl. .......................................... 714/16; 707/201
(58) Field of Search ............................. 714/16, 15, 20, 714/21, 38, 47; 707/201, 200, 202, 10, 203; 717/1, 11

(56) References Cited

U.S. PATENT DOCUMENTS

| | | | | |
|---|---|---|---|---|
| 4,868,744 A | * | 9/1989 | Reinsch et al. | 714/19 |
| 5,758,356 A | * | 5/1998 | Hara et al. | 707/202 |
| 5,819,020 A | * | 10/1998 | Beeler, Jr. | 714/5 |
| 5,845,292 A | * | 12/1998 | Bohannon et al. | 707/202 |
| 5,862,318 A | * | 1/1999 | Habben | 714/20 |
| 5,907,848 A | * | 5/1999 | Zaiken et al. | 707/202 |
| 5,966,706 A | * | 10/1999 | Biliris et al. | 707/10 |
| 5,995,980 A | * | 11/1999 | Olson et al. | 707/201 |
| 6,173,292 B1 | * | 1/2001 | Barber et al. | 707/200 |
| 6,363,499 B1 | * | 3/2002 | Delo et al. | 714/15 |
| 6,438,749 B1 | * | 8/2002 | Chamberlain | 717/174 |
| 6,567,928 B1 | * | 5/2003 | Lyle et al. | 714/15 |
| 6,618,822 B1 | * | 9/2003 | Loaiza et al. | 714/20 |

OTHER PUBLICATIONS

Patent No. 5,923,833 issued Jul. 13, 1999 by Freund, et al.; "Restart and Recovery of OMG–Complaint Transaction Systems".
Patent No. 6,154,847 issued Nov. 28, 2000 by Schofield, et al., "Method and System for Performing Resource Updates and Recovering Operational Records Within a Fault–Tolerant Transaction–Oriented Data Processing System".
Patent No. 5,850,507 issued Dec. 15, 1998 by Ngai, et al., "Method and Apparatus for Improved Transaction Recovery".
Patent No. 6,182,241 B1 issued Jan. 30, 2001 by Ngai, et al, "Method and Apparatus for Improved Transaction Recovery".

* cited by examiner

*Primary Examiner*—Nadeem Iqbal
(74) *Attorney, Agent, or Firm*—Choate, Hall & Stewart

(57) ABSTRACT

Most commercial database systems provide a recovery mechanism that is used to restore data integrity in the event of a hardware or software failure. Many of these systems restore the database from the most recent backup file by rolling forward all transactions from the most recent undamaged transaction log. The present invention discloses a novel system and method for recovering data from user or application errors. Embodiments of the present invention selectively target and undo only those transactions that caused data corruption. In this way, the present invention is able to recover fine-grained database objects such as a table or a row within a table. The present invention has the further advantage of minimizing the number of transactions that are lost after recovery.

66 Claims, 8 Drawing Sheets

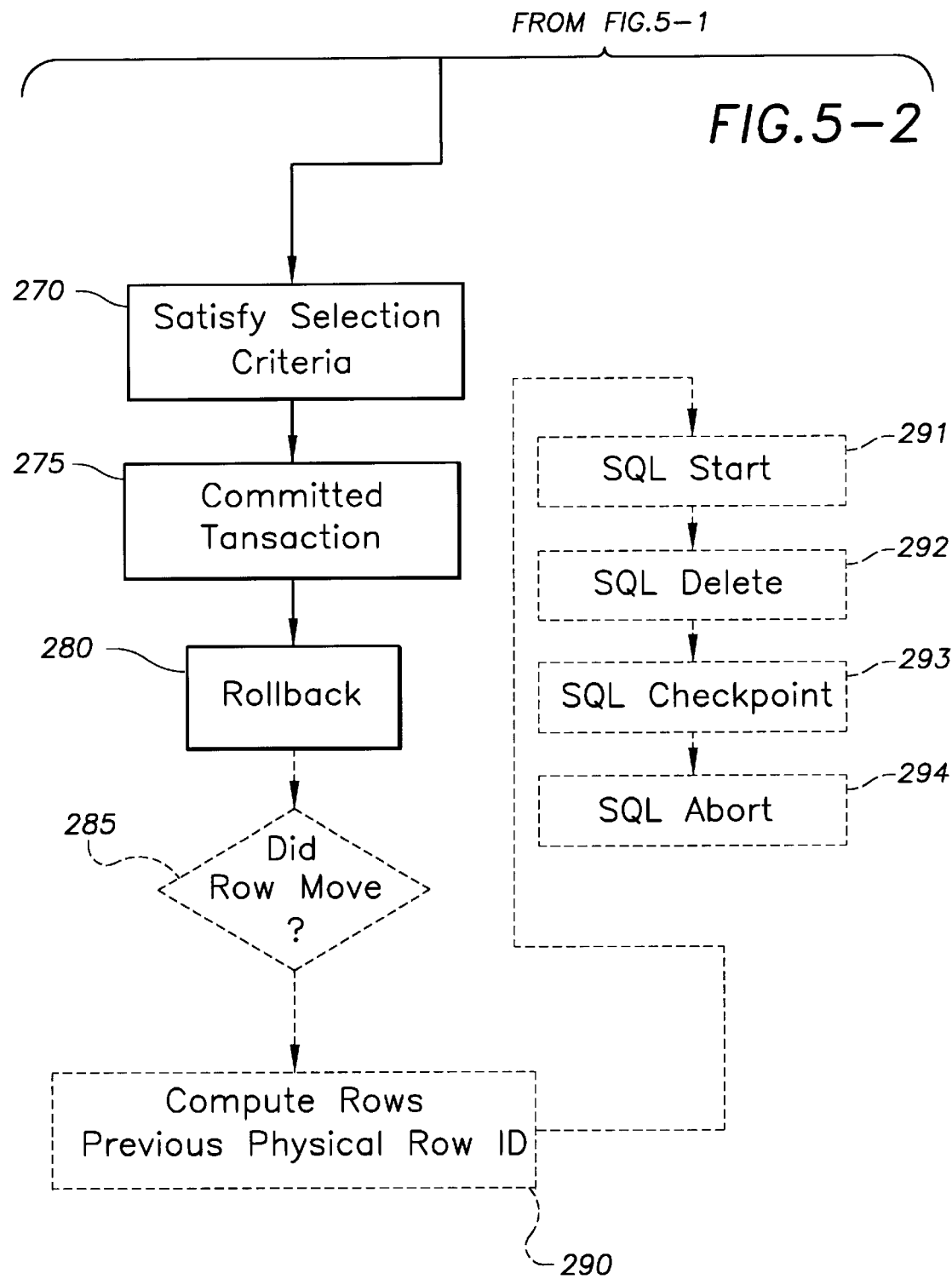

SYSTEM AND METHOD FOR TRANSACTION-SELECTIVE ROLLBACK RECONSTRUCTION OF DATABASE OBJECTS

PRIORITY CLAIM

This application claims the benefit of priority of U.S. Patent Application Ser. No. 60/207,006, filed May 25, 2000, entitled "A Mechanism for Transaction-Selective Rollback Reconstruction of Database Objects," the teachings of which are incorporated herein by reference.

BACKGROUND OF THE INVENTION

All database systems are vulnerable to failures that can cause data loss or corruption. Commercial database systems (e.g., SQL Server, Oracle, DB2, Sybase, etc.) typically provide a mechanism by which data may be restored in the event of a failure. Most commercial database systems restore data by utilizing the most recent backup copy of the database in conjunction with the database's transaction log. In order to accomplish data restoration using the traditional rollback mechanism, the database management software typically utilizes backups of a full image database backup and a transaction log. A transaction log is a file that records all changes to user and system data since the last full image database backup. The transaction log captures the state of the database before and after changes are made. Transaction logs contain less information than databases, and are thus backed up more frequently than databases. In a typical database system, several transaction log backups would occur between each successive full image database backup.

Many prior art database reconstruction techniques follow the procedure detailed below. These prior art reconstruction techniques restore the database by using the most recent full image backup. The database is then "rolled forward" to a point in time, just prior to the time of the failure, by reapplying every transaction from each transaction log backup file saved since the last full image database backup. This procedure effectively restores the database to the state in which it existed just prior to the database failure. One drawback of a roll-forward database reconstruction is that all transactions that were started, and possibly completed, after the time of the failure are lost.

These traditional backup and recovery techniques are designed to protect data from hardware and media failures, such as disk crashes. In a typical database system, however, a more likely cause of data corruption is a user or application error. An incorrectly formed ad-hoc SQL query or an application software error may inappropriately delete or modify data in the database. Traditional restore and roll forward mechanisms are sub-optimal and inefficient for recovering data from user or application errors.

In the first place, roll-forward reconstruction requires restoring a vast amount of data. The set of transactions that occurred since the last database backup, which must be reapplied during recovery from a system failure, is typically much larger than a set of transactions that could be "rolled back," thereby correcting a user or application error. "Undoing" a small set of erroneous transactions is a far more efficient method of restoring a database than is reapplying all valid transactions that occurred prior to a failure.

In addition, the traditional roll forward mechanism restores the database by rolling forward a backup image to a specific point in time. When recovering from user or application errors, this point in time is chosen to be the start time of an erroneous transaction that corrupted the database. By rolling the database forward to this particular point in time, the traditional mechanism effectively removes all transactions that may have occurred after the start of the erroneous transaction. By only rolling forward to the beginning point of the erroneous transaction, many transactions that occurred subsequent to the error, but that may have nonetheless have been valid transactions wholly independent of the database failure, are lost.

Some database systems (e.g., Microsoft SQL Server, Oracle) provide a recovery feature in which a "restore and roll forward" may be performed on an individual table basis. Although to some extent this feature mitigates the inefficiency of the roll forward method described above, it is still not sufficiently granular to permit the selection of erroneous transactions only. Furthermore, this feature applies the selectivity criteria at the database object level, not the transaction level, resulting in recovery of only coarse-grained database objects, such as a table. None of the prior art restore and roll forward methods allow recovery of fine-grained objects, such as an individual row within a table. There is thus a need for a method and apparatus for restoring a database that mitigates the inefficiencies of traditional roll forward techniques, while simultaneously allowing recovery of fine-grained objects.

SUMMARY OF THE INVENTION

The present invention is directed toward a system and method for reconstructing database objects using transaction-selective rollback. The present invention can be used in Microsoft SQL Server databases, as well as various other commercial databases, such as SyBase and Oracle databases. The embodiments disclosed herein overcome drawbacks of the prior art by efficiently rolling back only those transactions thought to be erroneous. In addition, the present invention allows users to reconstruct tables within databases with finer granularity than database reconstruction systems and methods of the prior art. In one embodiment, the present invention provides a method of constructing a rollback script comprised of commands used to restore the contents of the database to a state in which it existed prior to a series of transactions. In essence, this embodiment could be used to undo Insert, Delete, or Modify commands performed on the database. The present invention allows a user to exercise selectivity in the transactions that will ultimately be undone. A user could, for example, specify a certain time range within which the present invention could undo all transactions performed in the database. Additional selection criteria give a user the ability to undo, for example, transactions performed by a specific user or on a specific row. In addition, these selection criteria can be combined so that the present invention could undo, for example, all transactions performed by a specific user during a predetermined time range.

In an additional embodiment, the present invention allows a user to track all changes performed on a specified row within a database. This embodiment can reconstruct the contents of the row at any given time, even in databases where the only changes recorded in the log are delta changes. This embodiment is capable of being used when the database has a clustered key as well as when there is no clustered key indicating the new location of a row that has moved.

Additional embodiments are directed toward searching techniques wherein binary search techniques are used to take advantage of unique log record information contained in the transaction log. These search techniques allow the invention to quickly locate log records of interest within the transaction log. Additional embodiments are directed to computer-executable processes steps stored on a computer-readable medium for carrying out the steps associated with the embodiments described herein. In addition, the present invention is directed to an apparatus with memory means and a processor, configured to execute the steps associated with the various embodiments disclosed herein.

BRIEF DESCRIPTION OF THE DRAWING

The invention is described with reference to the several figures of the drawing, in which.

FIGS. 5-1 and 5-2 are flow charts related to Row Change Analysis embodiments of the present invention; and FIGS. 6-1 and 6-2 are flow charts illustrating embodiments of the present invention wherein row movement is detected.

DETAILED DESCRIPTION

Figure 1:
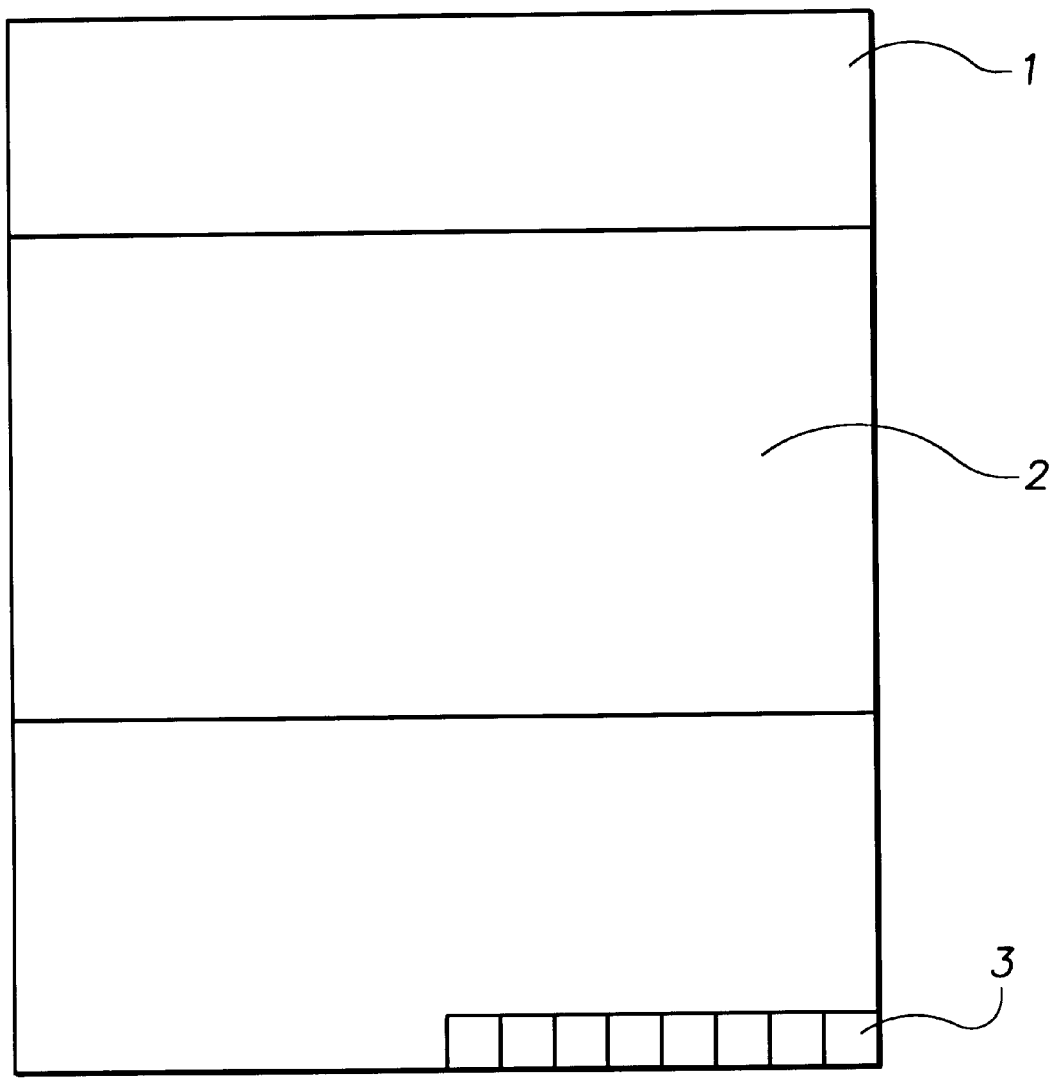
FIG. 1 is a block diagram of the layout of a data page in a Microsoft SQL database.

The present invention is directed toward a system and method for reconstructing database objects using transaction-selective rollback. Transaction-selective rollback is a technique used to undo a transaction, or series of transactions, performed on a database system. The transaction-selective rollback system and method of the present invention reverses erroneous transactions by using information stored in a transaction log. Most commercially available databases compile a log of all transactions performed on the database. This log, referred to as a transaction log, may vary slightly from database to database in terms of the format of the log or the type of information contained therein. While the embodiments disclosed herein are described by using Microsoft SQL databases as exemplary, it should be noted that the present invention is equally applicable to other databases, e.g., Oracle, SyBase, DB2, and the like. Before discussing the embodiments of the present invention, the concept of transaction logs, particularly in the context of a Microsoft SQL Server database system is discussed.

Transaction Logs

Most commercial database systems support the concept of transactions. Using Microsoft SQL Server databases as an example, a transaction is a user-defined sequence of one or more SQL commands. The database performs each user transaction as an atomic unit of work. An atomic transaction either fully succeeds or fully fails; it may not produce partial results. If a transaction succeeds, then all SQL commands within this transaction are guaranteed to succeed. If a transaction fails, then all partial results are undone, and the database is reverted to the state in which it existed before the failed transaction ran.

Illustratively, suppose a transaction consists of two SQL commands: insert a row into table X and insert a row into table Y. Further suppose that while performing this transaction, the database system successfully inserts a row into table X. But before it has a chance to insert a row into table Y, a power failure occurs. In this case, when the power is restored, the database software identifies the failed transaction as only partially successful and removes the inserted row from table X. Thus the database is reverted to its original state, as though the failed transaction never ran.

Database systems commonly employ a transaction log in order to provide transaction atomicity. A transaction log is a file that records the state of the database before a modification is made and the state of the database after the modification has been made. Any user and system activity that results in data modification is recorded in the log. The log enables the database system to reapply or reverse any data modification.

A transaction sequence begins with a log record whose operation code indicates "Begin Transaction." A transaction sequence is terminated with a log record whose operation code indicates the disposition of all operations within this sequence. If the entire transaction is successfully committed, the operation code indicates "Commit Transaction", otherwise it indicates "Abort Transaction." Every transaction sequence is uniquely identified by a transaction id assigned by the database system. A transaction id field is present in every log record. Log records having the same value in the transaction id field belong to the same transaction sequence. Every log record is uniquely identified by a log sequence number ("LSN"). A LSN is a monotonically increasing number that is used to locate a record in the physical log file. A LSN encodes the offset within the physical log file on which the corresponding log record begins.

Examples of Transaction Logs

In order to more easily conceptualize transaction logs, this section provides specific examples illustrating the type of information contained in a log record. The log records depicted in Tables 1–3 are the result of the following SQL command:

TABLE 1

BEGIN TRANSACTION

| Field Name | Value |
| --- | --- |
| Current LSN | 0000003e:00000207:0001 |
| Operation | "Begin Transaction" |
| Transaction Id | 0000:00005015 |
| Previous LSN | 00000000:00000000:0000 |
| SPID | 10 |
| Begin Time | 2000/04/30 17:11:15:887 |
| Transaction Name | D M L |
| Description | D M L |

A "Begin Transaction" log record marks the beginning of a sequence of operations that form a transaction. In the above example, the unique transaction id is 0000:00005015, the system process id ("SPID") that started the transaction is 10, the transaction started at 17:11:15 on 4/30, the name of the transaction is "DML".

TABLE 2

INSERT ROWS

| Field Name | Value |
| --- | --- |
| Current LSN | 0000003e:00000207:0002 |
| Operation | "Insert Rows" |
| Transaction Id | 0000:00005015 |
| Previous LSN | 0000003e:00000207:0001 |
| SPID | 10 |
| Object Name | Dbo.sample (1330103779) |

TABLE 2-continued

INSERT ROWS

| Field Name | Value |
|---|---|
| Page Id | 0001:00000189 |
| Slot Id | 0 |
| Previous Page LSN | 0000003e:00000203:000c |
| Length | 18 |
| Data Row | 300008000100000002000001001200616263 |

The "Insert Row" log record captures an insert operation. Object Name field identifies the table that receives the update. In the example above, the name of the table is "dbo.sample," and its object id is 1330103779. Object id is a unique identifier that may be mapped to a name via the standard SQL catalog system structures. The row was inserted to page 0001:00000189 slot 0, which means file id 1, page number 189, slot 0. The previous page LSN field contains the LSN of the previous operation that modified the same database page as is being modified by the present operation. In this example, the previous page LSN would identify the last operation that modified page number 189 in Fileid 1. The length field contains the length of the data row. The data row field contains binary data of the inserted row, exactly as it would appear in the physical database page. FIG. 1 depicts the structure of a Microsoft SQL database page. Microsoft SQL data pages have a fixed size of 8192 bytes. RON SOUKUP & KALEN DELANEY, INSIDE MICROSOFT SQL SERVER 7.0, 231–32, Microsoft Press, ($1^{st}$ ed. 1999), the contents of which are hereby incorporated by reference. With reference to FIG. 1, the first 96 bytes of the data page comprise the page header 1. The rest of the data page is comprised of data rows 2 and a row offset array 3. A data row 2 cannot span multiple pages. The number of rows stored on a given page varies depending upon the structure of the table and the data being stored. The row offset array 3 is a block of 2-byte entries, each of which indicates the offset on the page on which the corresponding data row begins.

TABLE 3

COMMIT TRANSACTION

| Field Name | Value |
|---|---|
| Current LSN | 0000003e:00000207:0005 |
| Operation | "Commit Transaction" |
| Transaction Id | 0000:00005015 |
| Previous LSN | 0000003e:00000207:0001 |
| SPID | 10 |
| End Time | 2000/04/30 17:11:15:897 |

"Commit Transaction" log record marks the end of a successful transaction. As can be seen from this example, these three log records indicate, respectively, that a transaction has begun, what that transaction is, and that the transaction has been successfully completed. While the above transaction accomplished inserting a row, a similar series of transaction logs could be constructed by the database if the transaction was a delete transaction. Tables 4 & 5 show an exemplary transaction log for a transaction where a row is modified. Table 4 shows the situation where the table does not include a clustered key. Table 5, on the other hand, is illustrative of a modify row when the table includes a clustered key.

TABLE 4

MODIFY ROWS

| Field Name | Value |
|---|---|
| Current LSN | 0000003e:00000208:0002 |
| Operation | "Modify Rows" |
| Transaction Id | 0000:00005016 |
| Previous LSN | 0000003e:00000208:0001 |
| SPID | 10 |
| Object Name | Dbo.sample (1330103779) |
| Page Id | 0001:00000189 |
| Slot Id | 0 |
| Previous Page LSN | 0000003e:00000207:2 |
| Offset in Row | 4 |
| Before Image | 01 |
| After Image | 02 |

The "Modify Rows" log record in the above table captures a Modify to a data row. The example above is a log record generated as the result of the following SQL statement:

UPDATE sample set a=2

Note that the Page Id, Slot Number fields contain the same values as the "Insert Rows" records; and that  is the Physical Row Id of the row. As will be discussed in further detail below with reference to particular embodiments of the present invention, the last three fields in the record may be used to rollback this update. Reversing the update comprises copying the Before Image (01) into "Offset in Row" (4) of the data row.

TABLE 5

MODIFY ROWS CLUSTERED

| Field Name | Value |
|---|---|
| Current LSN | 0000003e:0000022d:0002 |
| Operation | "Modify Rows Clustered" |
| Transaction Id | 0000:0000501f |
| Previous LSN | 0000003e:0000022d:0001 |
| SPID | 10 |
| Object Name | Dbo.sample2(1346103836) |
| Page Id | 0001:0000018d |
| Slot Id | 0 |
| Previous Page LSN | 0000003e:0000022c:2 |
| Offset in Row | 17 |
| Before Image | 616263 (abc) |
| After Image | 78797A (xyz) |
| Clustered Key | 1605000000020000 |

This example illustrates "Modify Rows" log record in the case when the table has a clustered key. The last field contains the value of the clustered key for the row that is being updated.

Embodiments of the Present Invention

Many of the embodiments of the present invention allow a user to specify which parameters to use when deciding what transactions should be rolled back. In these embodiments, a user may specify more than one selection criteria. In the context of database reconstruction, the user will typically have information regarding which transactions are likely to be erroneous. For example, it may be the case that a particular user, User X, executed a series of erroneous transactions on the database. In this example, all other transactions executed by the numerous users accessing the database are valid and should remain intact. The present invention could be used to undo just the transactions performed by User X. Similarly, the user of the present invention may wish to undo all transactions occurring within a specific timeframe, irrespective of which user executed the specific transaction.

Figure 2:
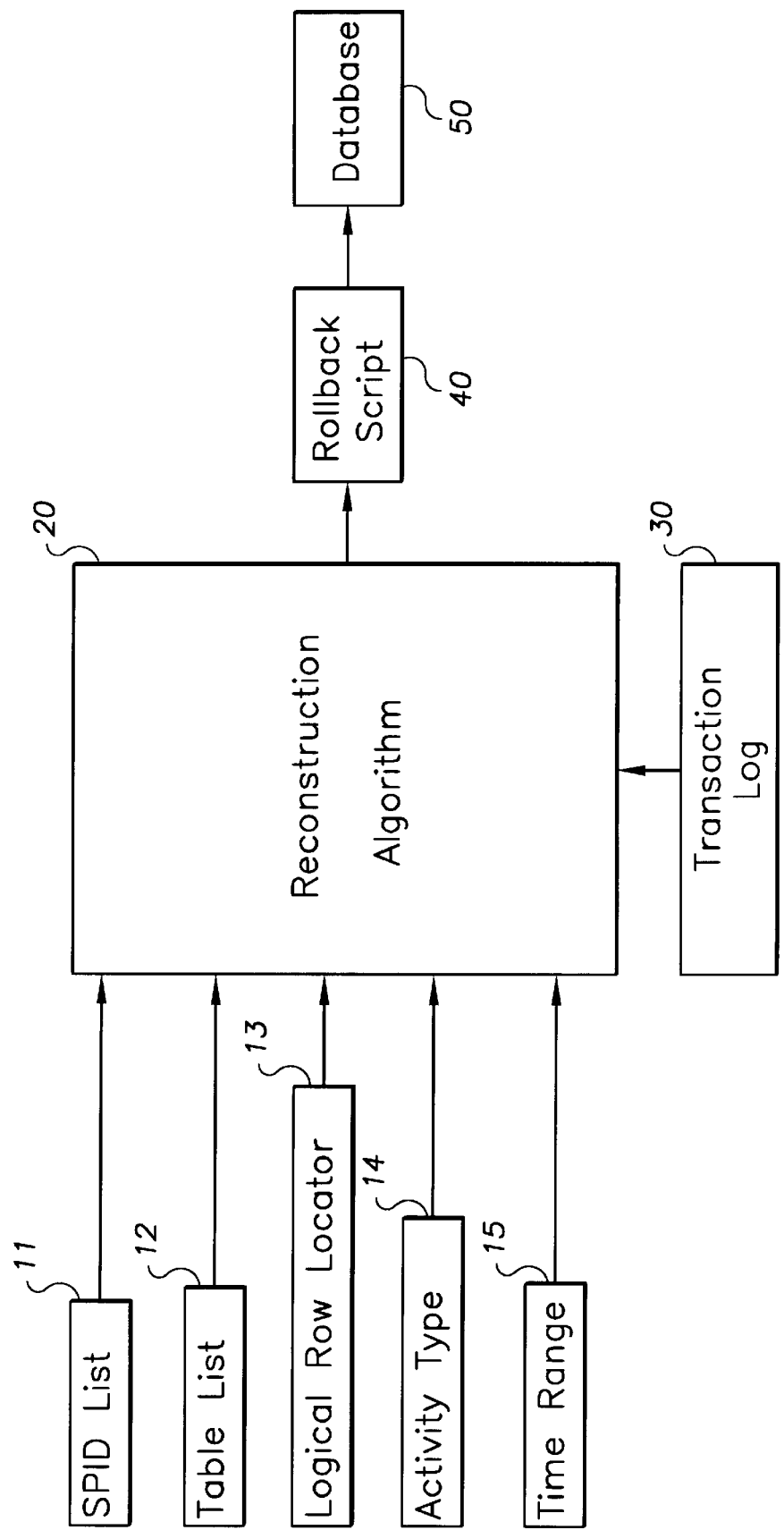
FIG. 2 is a block diagram illustrating the files accessed and constructed in creating a rollback script according to the present invention.

FIG. 2 shows a listing of the selection criteria 10 that may be used to determine which transactions to undo. The structure depicted in FIG. 2 is generalized so as to be conceptually applicable to both method and system embodiments of the present invention. With reference to FIG. 2, System Process ID "SPID" 11 is an identifier, uniquely distinguishing each user accessing the database. Table List 12 identifies one or more specific tables within a database. If this selection criterion is chosen, the present invention will undo all transactions affecting the specified table. If the users selects Logical Row Locator 13, on the other hand, all of the transactions affecting a particular row within a table will be undone.

The selection criterion Activity Type 14 allows a user to undo all transactions of a specific type, e.g., all "insert row" transactions. Databases typically perform three types of activities: insert row, modify row, or delete. As such, Activity Type 14 will be one of these transactions. The selection criterion Time Range 15 allows a user to rollback transactions occurring within a specified time range. The Time Range 15 criterion can be closed on both ends, i.e., rollback all transactions between two finite points in time, or can be open-ended on one end, i.e., rollback all transactions occurring before or after a specified time.

With reference to FIG. 2, once the selection criteria have been chosen, an embodiment of the present invention runs a reconstruction algorithm 20 that reconstructs the transactions corresponding to those specified by the selection criteria. The reconstruction algorithm, as well as additional algorithms disclosed herein, could be written in C++ or similar programming language. In order to reconstruct the relevant transactions, the reconstruction algorithm 20 extracts a set of log records from the transaction log 30, which match the specified selection criteria 10, and computes changes that must be applied to the current database in order to revert effected objects back to the state in which they existed prior to the erroneous transactions. These changes are used to generate standard SQL commands that are written into a single file referred to as a rollback script 40. The rollback script is a sequence of standard SQL commands that are applied to the database 50 in order to undo the erroneous transactions, or any transactions which a user wishes to undo.

In additional embodiments of the present invention, the general steps of the reconstruction algorithm 20 outlined above, i.e., using the selection criteria to extract appropriate log records from the transaction log 30, and computing the changes necessary to perform reconstruction, are performed differently depending upon whether Logical Row Locator 13 was one of the criteria specified. Accordingly, two different embodiments are detailed below, the first of which is directed toward the case when Logical Row Locator 13 has not been selected. This embodiment will be referred to as the Table Change Analysis embodiment because it admits transactions that affected any row in any of the selected tables. The second embodiment, where Logical Row Locator 13 has been selected, will be referred to as the Row Change Analysis embodiment because it admits only those transactions that modified a specified row. The Table Change Analysis embodiment is structurally similar to the Row Change Analysis embodiment, except in the way in which appropriate transactions are selected from the transaction log 30.

Table Change Analysis Embodiments

Figure 3:
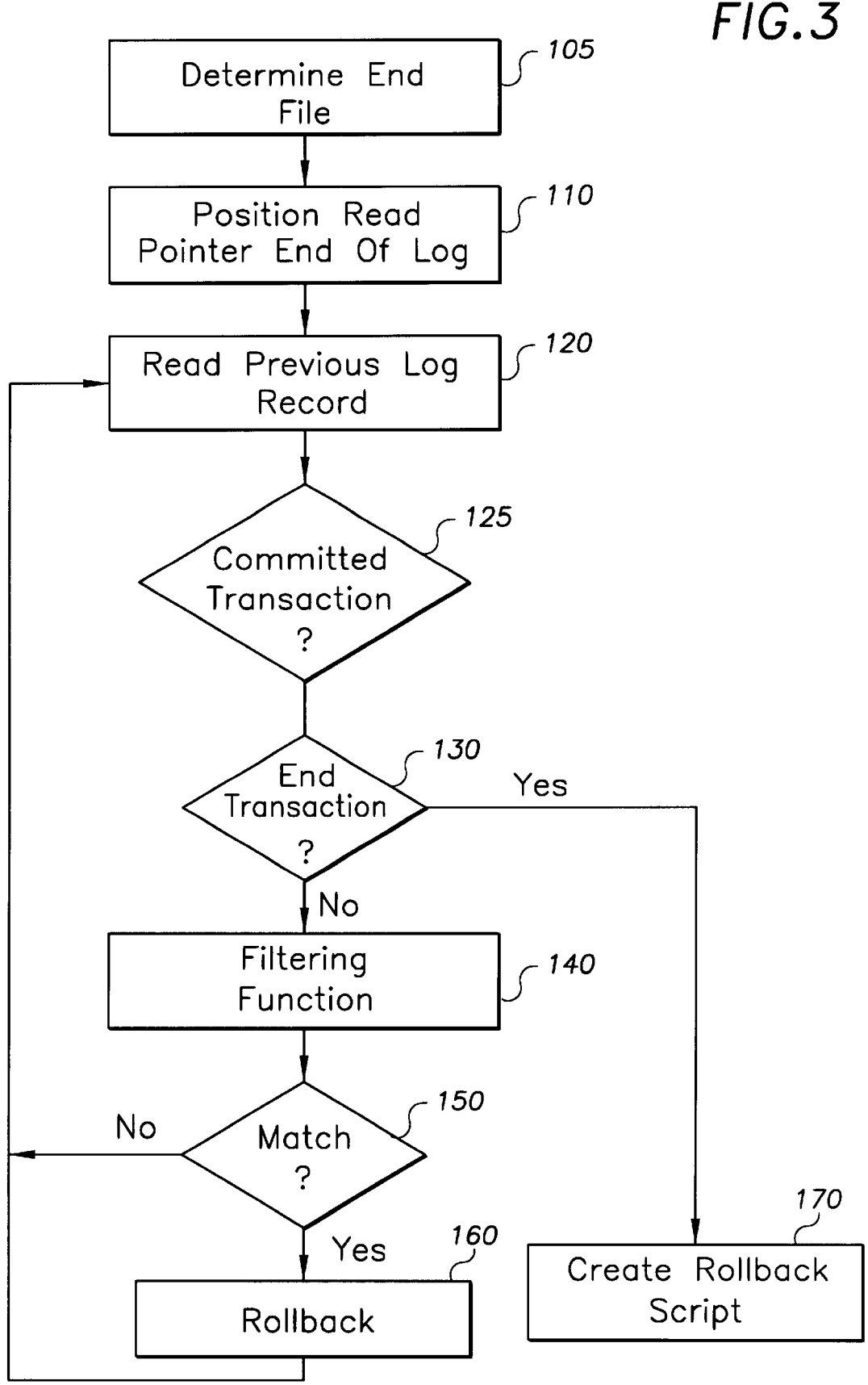
FIG. 3 is a flow chart depicting Table Change Analysis embodiments of the present invention.

FIG. 3 depicts the steps that are performed in a Table Change Analysis embodiment. A Table Change Analysis embodiment begins by determining 105 the end of the selected Time Range 15 from the selection criteria 10. It is necessary to determine the end of the transaction log because this Table Change Analysis embodiment reads through the transaction log in reverse chronological order, beginning at the end of the time range of interest. If no Time Range 15 was specified, i.e., $t_2$ is open-ended, the Table Change Analysis embodiment uses the end of the transaction log as the end of the time range. The end of the transaction log is determined by issuing the "CHECKPOINT" SQL command and then reading the log sequence number of the last checkpoint from the database boot record. If the end range is close ended, i.e., a $t_2$ is specified, the end of the transaction range is determined by performing a binary LSN range to find a transaction that occurred at $t_2$. After the end of the transaction range has been determined, a pointer is positioned 110 at the end of the transaction log.

With reference to FIG. 3, the next step in this Table Change Analysis embodiment is reading 120 the log record immediately preceding the pointer. After reading this log record, this embodiment determines 125 whether the operation captured in the log record belongs to a committed transaction. One way to make that determination could be maintaining a hash table of committed transaction ids. When this embodiment encounters a log record whose operation code indicates "committed transaction," it enters the record's transaction id into the hash table. When it encounters a log record whose operation code indicates "start of transaction," it removes the record's transaction id from the hash table. In order to determine whether the operation in the log record belongs to a committed transaction, the Table Change Analysis embodiment looks up the operation's transaction id in the hash table.

After determining 125 if the transaction is a committed transaction, it is necessary to determine 130 if the end of the transactions of interest has been reached. This is accomplished by using the selection criteria 10 discussed earlier with reference to FIG. 2. One of the selection criterion is Time Range 15. If Time Range was initially chosen as one of the selection criteria, the Table Change Analysis embodiment uses the beginning of the time range as its ending point. If no time range was specified, the Table Change Analysis embodiment reads through the entire transaction log. In this latter scenario, the end of the transactions of interest would be the first entry in the transaction log. Once all of the matching transactions in the $t_1$–$t_2$ range have been processed, the rollback script is created 170.

Assuming that the end of the transactions of interest has not been reached, each log record whose operation belongs to a committed transaction is submitted 140 to a filtering function. The filtering function determines whether the log record matches 150 all of the selection criteria 10 specified as input to the reconstruction algorithm. If more than one selection criteria 10 was chosen, the filtering function ensures that the log record satisfies all of the chosen selection criteria 10. If the log record matches all of the selection criteria, it is submitted 160 to the rollback function, described with more particularity below, for cumulative reconstruction. If, on the other hand, the log record does not match all of the selection criteria 10, it is not submitted to the rollback script 40 and the Table Change Analysis embodiment reads the previous log record from the transaction log 30.

The Rollback Function

The rollback function reverses Insert, Delete, and Modify operations. Intuitively, reversing an Insert operation involves deleting the inserted row, while reversing a Delete operation involves re-inserting the deleted row. Reversing a Modify operation involves rolling back the effected row by restoring all data columns to those values that existed before the update.

The rollback function accumulates all changes that are needed in order to reverse each operation in a temporary SQL table called "RollbackImage." The changes are recorded as full data row images that must be either inserted or deleted from a corresponding table. For every operation that it reverses, the rollback function modifies the RollbackImage table. These modifications vary depending upon the type of function being undone. If, for example, the rollback function reverses an Insert operation, it will record the full data row that must be deleted in order to undo the Insert operation in the RollbackImage table. Similarly, if the rollback function reverses a Delete operation, it adds a record to the RollbackImage table containing the full data row that must be inserted in order to undo the delete.

Undoing a Modify operation is a bit more complex. In order to undo a Modify operation, the rollback function determines what the effected row looks like presently, what it looked before the Modify operation, and what it looked like after the Modify operation. Each of these images is encoded as a record and added to the RollbackImage table.

The RollbackImage table is a standard SQL table with the following column schema.

TABLE 6

SCHEMA FOR ROLLBACKIMAGE TABLE

| Type | TableId | FileId | PageNum | SlotNum | RowData |
|---|---|---|---|---|---|
| char (1) | int (4) | smallint (2) | int (4) | smallint (2) | varbinary (8000) |

The Type column contains an action code that directs the reconstruction function, discussed more fully below, to formulate an appropriate rollback command. The following action types are specified:

"I"
  This action type indicates that this row must be inserted into the corresponding table. It contains an image of the row as it existed in the database before any of the selected transactions (in the $t_1$–$t_2$) range have been applied. (i.e., it is the row as it existed just prior to $t_1$).

"D"
  This action type indicates that this row must be deleted from the corresponding table.

"B"
  This type contains an image of the row as it currently exists in the database.

"P"
  This type contains an image of the row as it existed after all of the selected transactions in the $t_1$–$t_2$ range have been applied (i.e., this is the row as it existed just after $t_2$).

The value in the TableId column specifies the table for which this rollback change must be applied. The next three columns: FileId, PageId, SlotNum comprise the Physical Row Id of the corresponding table or a hash of a clustered key. Finally, the DataRow column contains a binary image of the row data, exactly as it would appear on a physical database page. The main goal of the rollback function is to reverse an operation. The following describes the process of reversing an operation.

Reversing an Operation

Figure 4:
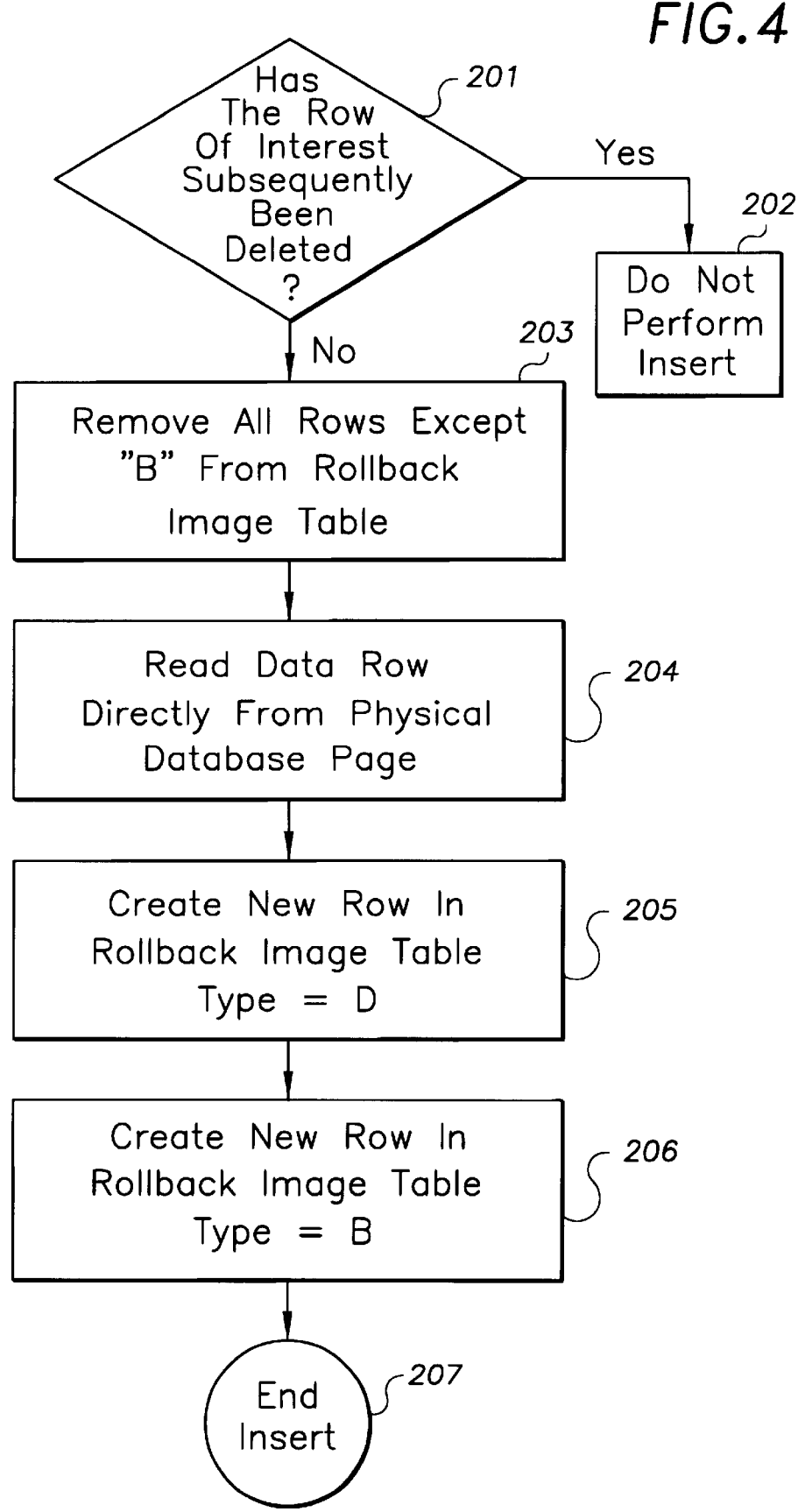
FIG. 4 is a flow chart showing the steps followed to reverse an Insert operation.

The input to the reversing function is a log record that describes the original operation that needs to be reversed. Each of the three operations, Insert, Delete, and Modify, require a unique series of steps in order to effectively reverse the operation. The process of reversing an Insert operation is shown in FIG. 4 and involves the following steps:

Determine if the row affected by the input log record has subsequently been deleted 201. If the row of interest has been deleted, even at a time beyond the end time chosen as a selection criterion, the Insert operation will not be reversed because the row of interest will eventually be deleted at some later point in time 202. Thus, the final version of the database will no longer contain that row. The process of determining whether the row has been subsequently deleted involves the process of 'Row Change Analysis', which is described later.

If the row has not been deleted, the next step is to remove all rows, except for those with type="B" from the RollbackImage table whose Physical Row Id and Table Id match the input log record's Physical Row Id and Object Id 203.

Read a data row directly from the physical database page identified by the Physical Row Id in the input log record 204.

Create a new row in the RollbackImage table with the following values:
  type="D"
  Physical Row Id=input log record's Physical Row Id
  DataRow=data row that was obtained directly from the physical page in the previous step 205.

Create a new row in the RollbackImage table with the following values:
  type="B"
  Physical Row Id=input log record's Physical Row Id
  DataRow=data row that was obtained directly from the physical page in the previous step 206. After this step, reversing the Insert command has been accomplished 207.

The process of reversing a delete operation involves the following steps:

Remove all rows, except for those with type="B" from the RollbackImage table whose Physical Row Id and Table Id match the log record's Physical Row Id and Object Id.

Create a new row in the RollbackImage table with the following values:
  type="I"
  Physical Row Id=input log record's Physical Row Id
  DataRow=data for the data row from the input log record.

The process of reversing a Modify involves the following steps. If the RollbackImage table contains a row with the same Row Id as found in the input log record, then the RowData column in the RolbackImage table is updated to reflect the image of the row as it existed prior to the "Modify" operation recorded in the input log record.

If the RollbackImage table does not contain a row with the same Row Id as found in the input log, the reverse function must compute B, I and P, where B is the row as it presently exists in the database, I is the row as it existed just prior to $t_1$, and P is the row as it existed just after $t_2$. Determining B is straightforward because the reverse function need only determine the present contents of the row of interest. Determining I and P can be accomplished by utilizing the Row Change Analysis embodiment, discussed more fully below. The Row Change Analysis embodiment is capable of determining what a particular row looked like at any given point in time. As such, this embodiment is well suited for determining I and P. Once the reverse function has determined B, I, and P, a reverse function is used to create the rollback script that will undo the Modify operation.

Each of the records, B, P, and I, are written into the RollbackImage table. These records (B, P and I) will be used by the "Reconstruction" function to generate appropriate SOL UPDATE commands. An "UPDATE" command has a "set" clause, indicating which columns are updated, and a "where" clause, indicating what row should be updated. I and P are used to generate the "set" clause, and B is used to generate the "where" clause. The following example highlights how the reconstruct function could use B, P, and I to create a rollback script for a Modify operation.

Assume that a user wished to rollback the transactions occurring at $t_2$ and $t_3$ in Table 7. The reconstruct function in this hypothetical would have information concerning which page and slot number was affected by the transactions that will be undone because this information is contained in the log records for $t_2$ and $t_3$. Assume for purposes of this example that these transactions occurred in page 1, slot 0 of the database. One skilled in the art will recognize that this location is arbitrary and that the embodiments disclosed herein will perform in a similar fashion irrespective of the physical page and slot location of the table on which the reverse function is being performed.

TABLE 7

EXAMPLE TRANSACTION LOG

| Time | Operation | Log Contents | Result |
|---|---|---|---|
| $t_1$ | I: ABC | ABC | ABC |
| $t_2$ | M: C/X | C/X, pos 3 | ABX |
| $t_3$ | M: B/C | B/C, pos 2 | ACX |
| $t_4$ | M: C/D | C/D, pos 2 | ADX |

As can be seen from Table 7, B, the present contents of page 1, slot 0, is ADX. After computing B, the Row Change Analysis embodiment could be used to reconstruct P and I. In order to accomplish this reconstruction, it is necessary to locate all modifications that have occurred on the row of interest, in this case page 1, slot 0. In this embodiment, the transaction log could be quickly traversed by taking advantage of the unique LSN associated with each log record and the fact that LSNs increase sequentially as one progresses through the transaction log. The LSN contains information which allows the Row Change Analysis embodiment to determine which transaction last modified the row of interest. This search method also relies on the "Previous Page LSN" field of a log record. The previous page LSN points to a chronologically previous log record where an operation modified the physical database page on which the selected row resides. Instead of scanning every row from the log in reverse chronological order, this embodiment follows the Previous Page LSN pointer in order to obtain a previous log record that performed a modification to the row of interest.

The reverse function can utilize this information to reconstruct P and I. The reverse function would know which LSN it was looking for because it would have read the LSN presently existing on page 1. From that, the reverse function obtains information regarding the transaction that last modified page 1. Using the Previous Page LSN, it is possible to search through the entire transaction log expeditiously by analyzing only those transactions that made modifications to the page of interest.

In the above embodiment, the reverse function could reconstruct P and I by first determining the LSN for the last transaction that modified page 1. With this information, the Row Change Analysis embodiment could then search for that LSN. Once the LSN of interest is located, the Row Change Analysis embodiment could apply the modifications to the data stored in B. This embodiment then reads the LSN on the page of interest to determine which LSN performed the previous modification of page 1, slot 0. Again, that second LSN is located and those modifications are applied to B. The Row Change Analysis embodiment continues to perform the searching and modifying techniques described above until it reaches the log records corresponding to the modifications that occurred at $t_2$ and $t_3$. In this way, the Row Change Analysis embodiment reconstructs P and I. Once P and I have been determined, the reverse function has all of the information it needs to undo the Modify operations that occurred at $t_2$ and $t_3$.

In an alternative embodiment, traditional search mechanisms involving reading the entire transaction log could be implemented. These traditional search methods would not alter the techniques used to reconstruct P and I disclosed herein. Rather, traditional search mechanisms would lengthen the amount of time necessary to reconstruct P and I.

An alternative search method employing binary search techniques could be used to undo transactions occurring within a specified time range. This search method could be employed when, for example, a user seeking to undo transactions chose only a start and end time, $t_1$, and $t_2$, as the selection criteria 10. In this situation, the present invention would first attempt to locate $t_2$ in the transaction log. Locating $t_2$ could be an arduous task if the transaction log is substantial, which is most often the case. This search method also uses the LSN, in particular, the fact that the LSN encodes an offset value for where its log record is located in the log file. A binary search technique could split the transaction log in half, and search through the transaction log in 512 byte increments. At some point in this progression forward, this search technique will arrive at the start of an LSN where the offset contained in the LSN matches the present location in the transaction log. This information can be used to determine time and could thus be used to locate $t_1$, and $t_2$.

The reconstruction function is the final step of the selective rollback algorithm. The reconstruction function creates a rollback script that consists of an ordered sequence of standard Insert and Delete SQL commands. These commands must be executed in the same order in which they exist in the script file in order to revert all affected tables to the state in which the existed before the time period of interest. An Insert or Delete SQL command is constructed by consulting standard SQL catalog tables (syscolumns) that describe the structure of a table row in terms of column names and relative positions within a row. The values for the columns are constructed by parsing the physical data row stored in the DataRow column. Once the rollback script has been constructed, it is applied to the database, thereby reverting the database to the way it existed prior to the transactions chosen by the user initially as those which should be reversed.

Row Change Analysis Embodiments

An additional embodiment, referred to as the Row Change Analysis function or embodiment and discussed briefly above, is structurally similar to the Table Change Analysis embodiment, differing mainly in the way in which it traverses the transaction log and identifies log records that contain modifications targeted for the selected row. The Row Change Analysis embodiment is capable of tracking the entire history of a row. It can determine what a row looked like at any point in time.

Figures 1, 5:
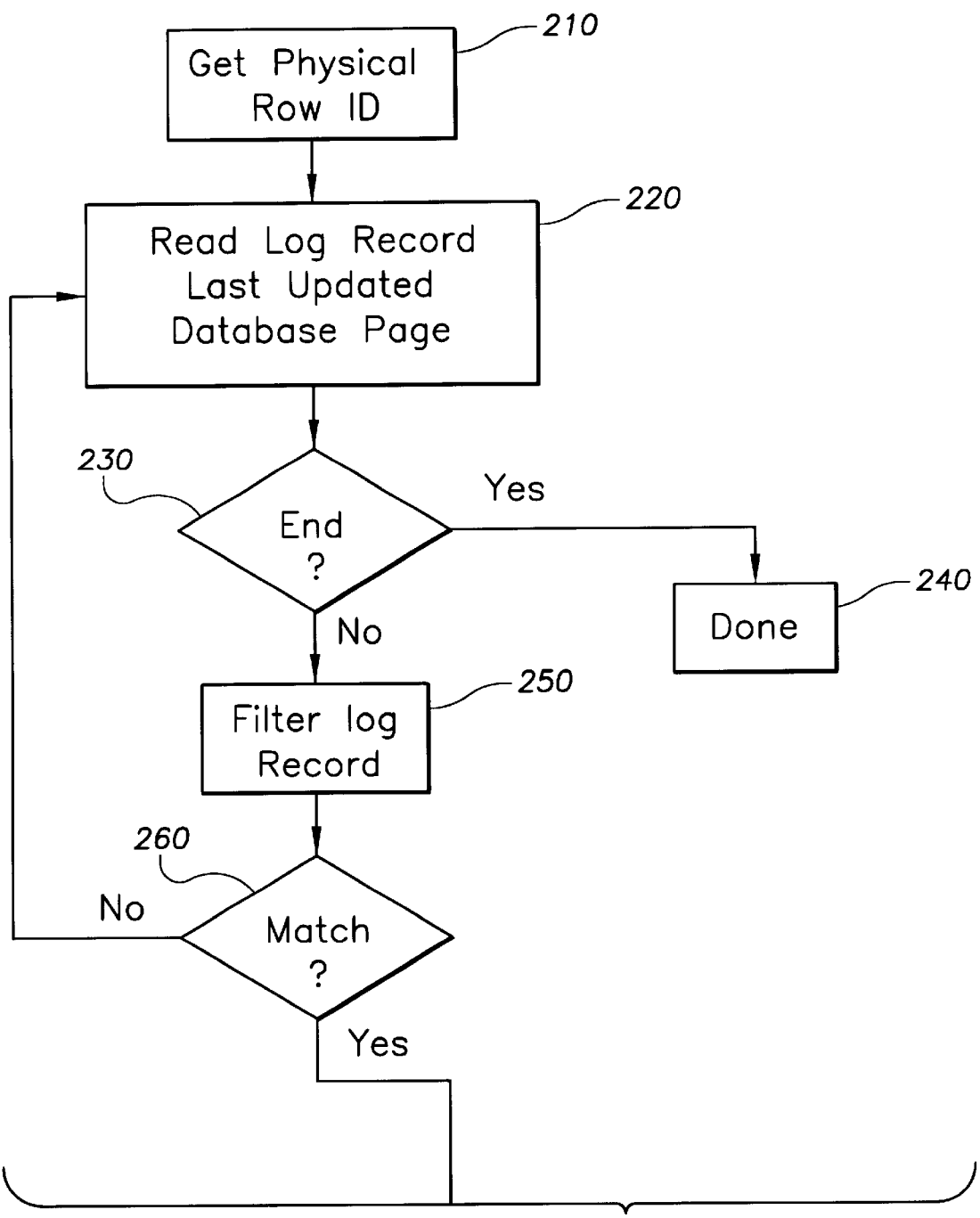

The first step in the Row Change Analysis embodiment, depicted in FIG. 5, entails establishing 210 the Physical Row Id of the rows implicated by the selection criteria 10 in order to identify those log records that caused the row to change. In order to find log records that capture modifications to the selected row, it is possible to scan the log in reverse chronological order looking for log records with matching Physical Row Ids. In one embodiment, the LSN searching described above can be used to find log records that caused changes to the specific row. In this embodiment, the starting position for an LSN search 220 could be the log record that contains the most recent modification to the physical page that contains the row of interest. The LSN for this log record is obtained from the control section of the physical page on which the selected row resides. The Physical Page Id is part of the Physical Row Id that was described previously.

The Row Change Analysis function continues to read log records that have made changes to the physical page in reverse chronological order until one of two things happens, either the Previous Page LSN contains zeros, indicating that no more modifications to the specified page exist, or the Previous Page LSN points to a log record that is not found in the current log file 230. If either of these events transpires, the Row Change Analysis function terminates 240. If neither of these events occurs, the log record is filtered 250 in a manner similar to that described above with reference to the Table Change Analysis embodiment. The Row Change Analysis function matches 260 the Physical Row Id contained in the log record to the Physical Row Id of the selected row. If they do not match, the function skips this record and obtains 220 a previous one by following the Previous Page LSN pointer. If the Physical Ids do match, the filtering function determines 270 if the operation matches all of the selection criteria 10. After determining that the selection criteria are satisfied by the log record, the Row Change Analysis function determines 275 whether the operation captured by the log record belongs to a committed transaction. It makes that determination by reading the transaction log forward from the position on which the current log record begins, looking for a log record with operation code "Commit Transaction" and a matching transaction Id. The Row Change Analysis function declares the transaction "committed" only if it encounters a corresponding "Commit Transaction" record. If the original log record passes both of the filtering steps depicted at 270 and 275 of FIG. 5, it is submitted 280 to the Rollback function.

The Rollback function referred to in this embodiment is similar to the rollback function described above with reference to the Table Change Analysis embodiment. Because the Row Change Analysis function is tracking changes to a single specific row, only one record exists in the Rollback-Image table. An embodiment of the Row Change Analysis function uses an optimization in which this record could be stored in a memory buffer, rather than a disk based SQL table.

After having applied the rollback function, the Row Change Analysis function determines whether the last operation caused the physical row to be relocated to a new page 285. If relocation has occurred, the Row Change Analysis function computes 290 the row's previous Physical Row Id, which reflects its previous physical page residence, and uses this value as the row's Physical Row Id.

One way to determine the Physical Row Id is by a "pseudo-delete" mechanism. The pseudo-delete mechanism causes the Physical Row Id to appear in the transaction log by performing a "pretend" delete operation of the specified row. A "pseudo-delete" could be performed using the following steps:

Issue a standard SQL command that indicates the start of a named user transaction sequence 291. The name assigned to the transaction is chosen to be such that it is uniquely identifiable within the log file. One example of the start of a named user transaction could be begin transaction "unique name."

Issue a standard SQL Delete command to delete the specified row from the database. 292

Issue the standard SQL checkpoint command to cause the database to flush all memory buffers to disk. 293

Issue a standard SQL command that aborts the current user transaction. 294 One example of a command aborting the current user transaction could be "rollback."

The above sequence of standard SQL commands results in a log record that captures the delete operation. This log record contains the Physical Row Id of the specified row. In order to obtain that Physical Row Id, the Row Change Analysis function reads the transaction log until it finds a transaction with the specified name. This embodiment then continues to read the transaction log until it obtains a log record whose operation type is "Delete" and whose Object Id matches the object id of the table from which the specified row was deleted.

Two additional embodiments can be used to detect if a specific operation described by a log record has caused a data row to be relocated. One of these embodiments could be used when the underlying SQL table contains a clustered key, while the second embodiments could be used in the absence of a clustered key. In both embodiments, a method is provided for determining the Physical Row Id from which the data row was dislocated.

Figures 1, 6:
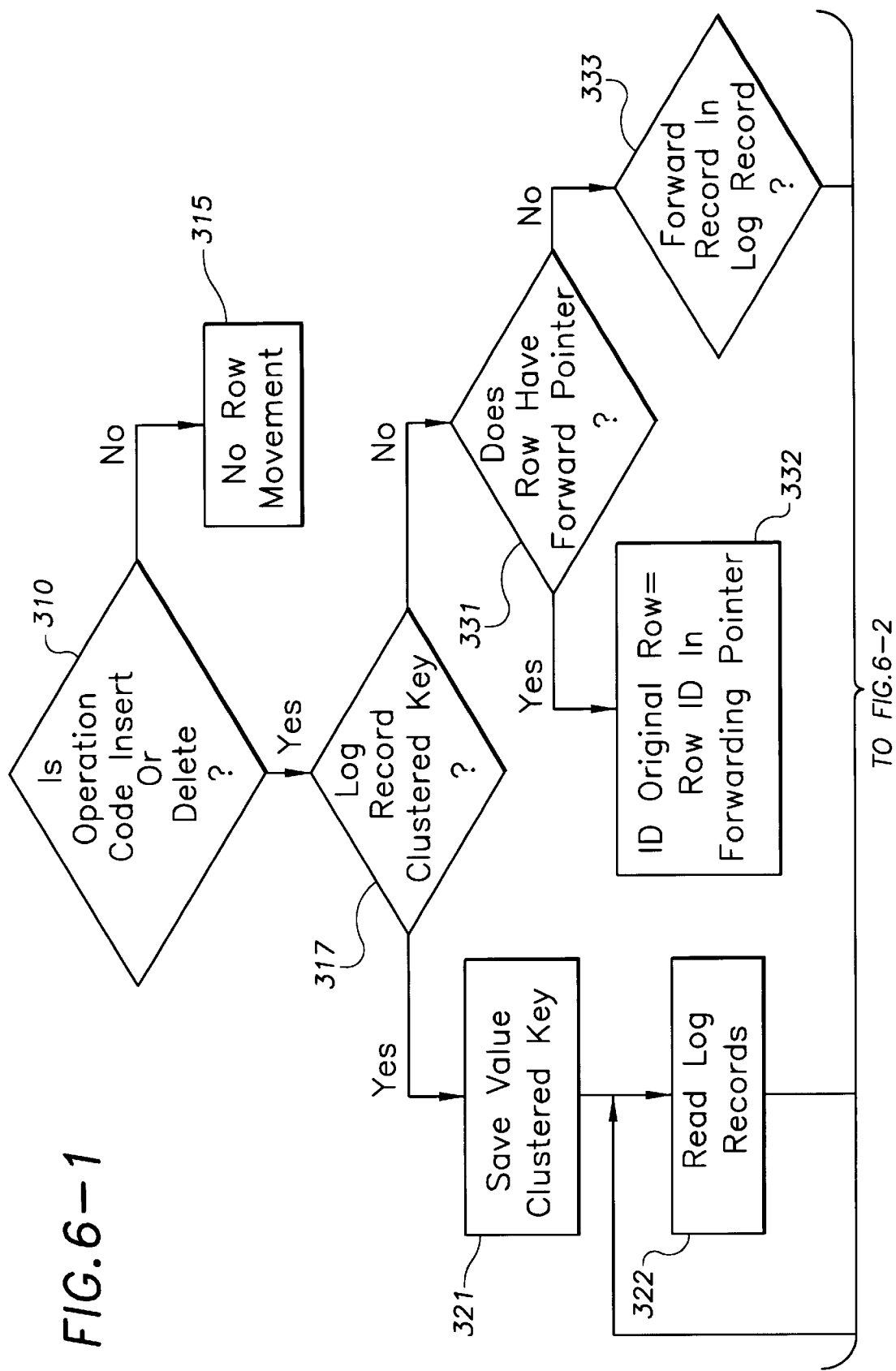
Figures 2, 6:
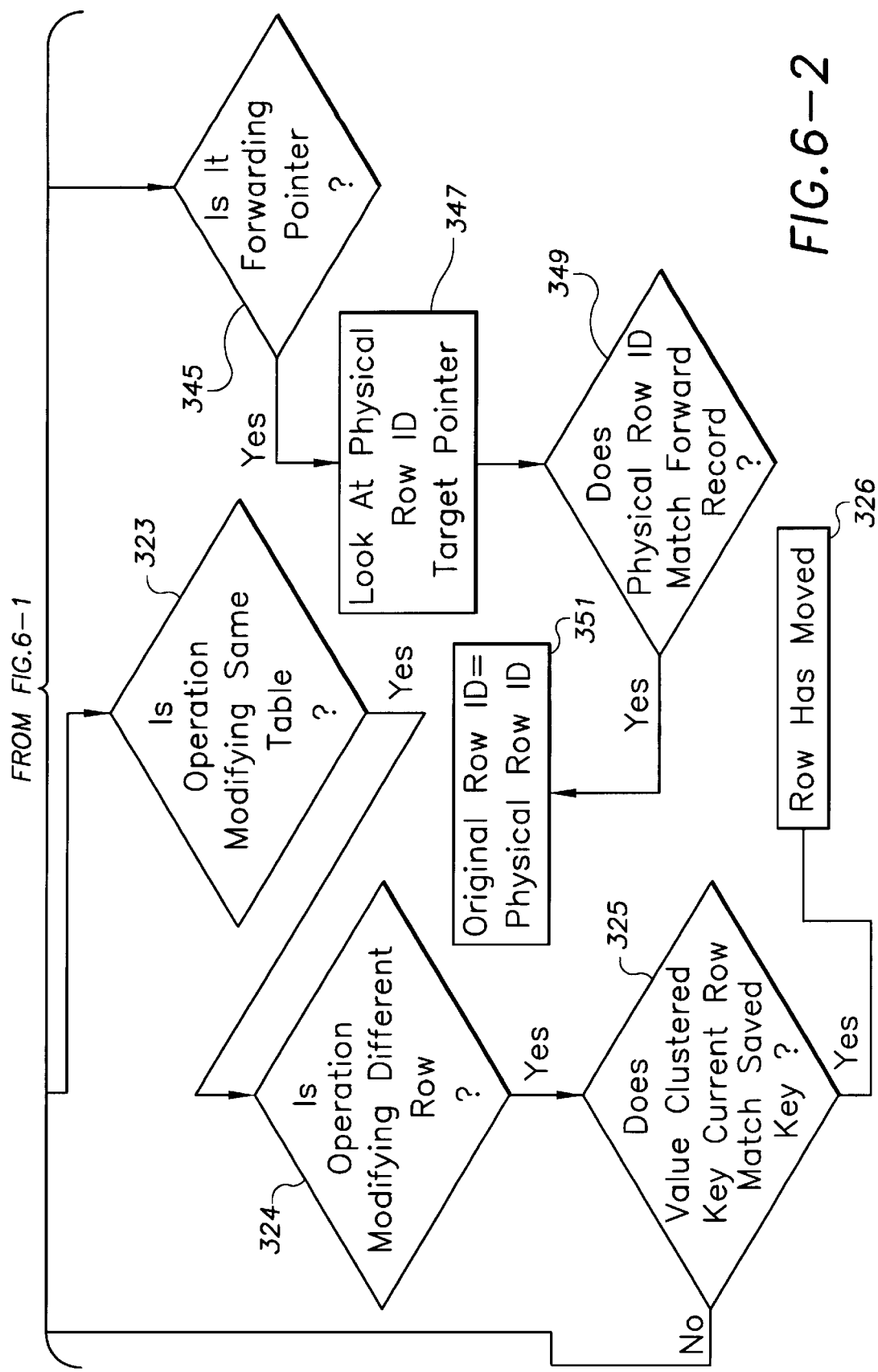

In both embodiments, the only operation codes that indicate the possibility of a row movement are: "Insert" and "Delete". With reference to FIG. 6, the first step in either embodiment is to determine 310 if the operation code is Insert or Delete. If the operation code is neither Insert or Delete, the detection mechanism declares 315 that row movement has not occurred. If row movement has occurred, the next step is to determine if the row has a clustered key 317. If the row has a clustered key, a row movement has occurred if two conditions are met. First, another operation in the same transaction performed a modification to a row in the same table. Second, that row had the same clustered key value, but a different Physical Row Id.

The steps performed in this embodiment to determine if these conditions have been met are as follows. First, the value of the clustered key from the current log record is saved 321. Then, all of the log records that captured operations belonging to the same transaction as the one in the original log record are read in an iterative fashion 322. As each record is obtained, it is examined to determine whether it meets all of the following conditions:

The operation in the current record is modifying the same table as the operation in the original record 323;

The operation in the current record is modifying a different row than the operation in the original record (Physical Row Ids are different) 324; and The value of the clustered key of the data captured in the current row matches the value of the saved clustered key 325.

If the current record meets all of these conditions, the row has moved as the result of the operation captured in the original log record. The Physical Row Id from the row that was relocated is the Physical Row Id of the current log record. In this way, this embodiment is capable of locating a row that has moved when that row has a clustered key.

An alternative embodiment, used to detect row movement in the absence of a clustered key, relies on the following database system properties. If a row moves from its original location to a new location, the database system converts the original row into a forwarding pointer and the new row is marked with a record type that indicates "Forwarded Row". If that forwarded row moves again, the database system updates the original forwarding pointer to reflect a new location. If a row returns to its original location, the forwarding pointer is converted back into a regular data row.

In this alternative embodiment, it is necessary to determine if the input log record contains a data row whose type id is a "Forwarding Pointer" 331. If it does, the row has moved. The Row Id of the original row is the Row Id contained in the forwarding pointer record 332. If the input log record did not contain a data row whose type id is a Forwarding Pointer, this embodiment determines if the log record contains a data row whose type is a "Forwarded Record" 333. If it does, the row has moved. In this embodiment, the original Physical Row Id is contained in another operation of the same transaction. In order to find that operation, the following steps are implemented. Each data row portion of all of the operations with the same transaction id as the input log record are examined in an iterative fashion. This examination entails determining if it is a Forwarding pointer 345. If it is a Forwarding pointer, the Physical Row Id that is the target of the pointer is examined 347. If the Physical Row Id in the pointer matches the physical Row Id of the "Forwarded Record" data row from the input log record 349, the row has moved. In this case the original Row Id, from which the "Forwarded Record" row was relocated, is the Physical Row Id of the forwarding pointer record 351.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of constructing a rollback script used to modify data in a database comprising the steps of:

choosing at least one selection criterion for use in determining if a transaction in a transaction log should be rolled back;

determining an end of a time range for use in terminating searching of the transaction log, searching the transaction log to find at least one log record that satisfies the at least one selection criterion, wherein the at least one log record contains an operation that is part of a committed transaction;

extracting the at least one log record from the transaction log;

computing a command for use in rolling back the operation contained in the at least one log record; and writing the command to a rollback script.

2. The method of claim 1, wherein the at least one selection criterion is selected from the group consisting of SPID List, Table List, Activity Type, Time Range, and Logical Row Locator, wherein Logical Row Locator is a specific row within a table described by a standard SQL language.

3. The method of claim 1, wherein determining an end of a time range further comprises the steps of:

issuing a checkpoint command; and reading a log sequence number of a last checkpoint command from a database boot record.

4. The method of claim 2, wherein determining an end of a time range further comprises the step of:

using the at least one selection criteria to determine the end of the time range.

5. The method of claim 1, comprising the step of:

accumulating changes needed to rollback each effected row of a table.

6. The method of claim 5, wherein the transaction is an Insert.

7. The method of claim 6, wherein the changes needed to rollback the transaction comprise the steps of:

determining if a row affected by the operation in an input log record was subsequently deleted in the database; and determining that no change is needed to rollback the transaction if the row affected by the operation in the input log record was subsequently deleted in the database.

8. The method of claim 6, wherein the changes needed to rollback the transaction comprise the steps of:

determining if a row affected by the operation in an input log record was subsequently deleted in the database;

maintaining a temporary table that contains row images as they existed at various time points;

removing all rows from the table, except for rows of type "B," whose Physical Row Id and Table Id match the input log record's Physical Row Id and Object Id;

reading a data row directly from a physical database page identified by the Physical Row Id in the input log record;

creating a new row in the table of type "D" and Physical Row Id equal to the input log record's Physical Row Id and DataRow equal to the data row read directly from the physical database page identified by the Physical Row Id in the input log record; and creating a new row in the table of type "B", and Physical Row Id equal to the input log record's Physical Row Id and DataRow equal to the data row read directly from the physical database page identified by the Physical Row Id in the input log record.

9. The method of claim 5, wherein the transaction is a Delete.

10. The method of claim 9, comprising the steps of:

removing all rows whose Physical Row Id and Table Id match the input log record's Physical Row Id and Object Id, except those of type "B"; and creating a new row in the table of type "I" and Physical Row Id equal to a physical row id of the input log record and DataRow equal to a data row of the input log record.

11. The method of claim 5, wherein the transaction is a Modify.

12. The method of claim 11, comprising the steps of:
determining if the table contains a row with the same Row Id as an input log record; and
using the row with the same Row Id to perform the Modify transaction.

13. The method of claim 1, wherein the at least one selection criterion is Time Range and searching the transaction log comprises using binary search techniques.

14. The method of claims 1, 2, 3, 4, 5, 6, 7, 8, 9, 10, 11, 12 or 13, wherein the database is a SQL Server database.

15. A method for determining the contents of a row in a database at any point in time comprising the steps of:
determining an LSN for the row;
searching a transaction log using the LSN in order to identify at least one log record that performed a transaction on the row; and
filtering the at least one log record to determine if the transaction was committed.

16. The method of claim 15, wherein the searching is performed in reverse chronological order.

17. The method of claims 15 or 16, further comprising the step of:
determining if the row was relocated to a different physical page.

18. The method of claim 17, wherein determining if the row was relocated is done with a pseudo-delete mechanism.

19. The method of claim 17, wherein determining if the row was relocated is further comprised of the steps of:
analyzing an operation code in the at least one log record;
determining if the row has a clustered key;
saving the value of the clustered key; and
analyzing a set of log records to determine what modification each log record made and if a clustered key in each log record matches the saved clustered key.

20. The method of claim 17, wherein determining if the row was relocated is further comprised of the steps of:
analyzing an operation code in the at least one log record; and
determining if the row has a forward pointer.

21. The method of claims 15, 16, 18, 19, or 20, wherein the database is a SQL Server database.

22. The method of claim 17, wherein the database is a SQL Server database.

23. Computer-executable process steps stored on a computer-readable medium, the computer-executable process steps to construct a rollback script used to restore data in a database, the computer-executable process steps comprising:
code to choose at least one selection criterion for use in determining if a transaction in a transaction log should be rolled back;
code to determine an end of a time range for use in terminating searching of the transaction log,
code to search the transaction log to find at least one log record that satisfies the at least one selection criterion, wherein the at least one log record contains an operation that is part of a committed transaction;
code to extract the at least one log record from the transaction log;

code to compute a command for use in rolling back the operation contained in the at least one log record; and
code to write the command to a rollback script.

24. The computer executable process steps of claim 23, wherein the at least one selection criterion is selected from the group consisting of SPID List, Table List, Activity Type, Time Range, and Logical Row Locator, wherein Logical Row Locator is a specific row within a table described by a standard SQL language.

25. The computer executable process steps of claim 23, wherein determining an end of a time range further comprises:
code to issue a checkpoint command; and
code to read a log sequence number of a last checkpoint command from a database boot record.

26. The computer executable process steps of claim 24, wherein determining an end of a time range further comprises:
code to use the at least one selection criteria to determine the end of the time range.

27. The computer executable process steps of claim 23, comprising:
code to accumulate changes needed to rollback each effected row of a table.

28. The computer executable process steps of claim 27, wherein the transaction is an Insert.

29. The computer executable process steps of claim 28, wherein the changes needed to rollback the transaction comprise:
code to determine if a row affected by the operation in an input log record was subsequently deleted in the database; and
code to determine that no change is needed to rollback the transaction if the row affected by the operation in the input log record was subsequently deleted in the database.

30. The computer executable process steps of claim 28, wherein the changes needed to rollback the transaction comprise:
code to determine if a row affected by the operation in an input log record was subsequently deleted in the database;
code to maintain a temporary table that contains row images as they existed at various time points;
code to remove all rows from the table, except for rows of type "B," whose Physical Row Id and Table Id match the input log record's Physical Row Id and Object Id;
code to read a data row directly from a physical database page identified by the Physical Row Id in the input log record;
code to create a new row in the table of type "D" and Physical Row Id equal to the input log record's Physical Row Id and DataRow equal to the data row read directly from the physical database page identified by the Physical Row Id in the input log record; and
code to create a new row in the table of type "B", and Physical Row Id equal to the input log record's Physical Row Id and DataRow equal to the data row read directly from the physical database page identified by the Physical Row Id in the input log record.

31. The computer executable process steps of claim 27, wherein the transaction is a Delete.

32. The computer executable process steps of claim 31, further comprising:
code to remove all rows whose Physical Row Id and Table Id match the input log record's Physical Row Id and Object Id, except those of type "B"; and code to create a new row in the table of type "I" and Physical Row Id equal to a physical row id of the input log record and DataRow equal to a data row of the input log record.

33. The computer executable process steps of claim 27, wherein the transaction is a Modify.

34. The computer executable process steps of claim 33, further comprising:
    code to determine if the table contains a row with the same Row Id as an input log record; and
    code to use the row with the same Row Id to perform the Modify transaction.

35. The computer executable process steps of claim 23, wherein the at least one selection criterion is Time Range and searching the transaction log comprises using binary search techniques.

36. The computer executable process steps of claims 23, 24, 25, 26, 27, 28, 29, 30, 31, 32, 33, 34, or 35, wherein the database is a SQL Server database.

37. Computer-executable process steps stored on a computer-readable medium, the computer-executable process steps to determine the contents of a row in a database at any point in time the computer-executable process steps comprising:
    code to determine an LSN for the row;
    code to search a transaction log using the LSN in order to identify at least one log record that performed a transaction on the row; and
    code to filter the at least one log record to determine if the transaction was committed.

38. The computer-executable process steps of claim 37, wherein the searching is performed in reverse chronological order.

39. The computer-executable process steps of claims 37 or 38, further comprising:
    code to determine if the row was relocated to a different physical page.

40. The computer-executable process steps of claim 39, wherein determining if the row was relocated is done with a pseudo-delete mechanism.

41. The computer-executable process steps of claim 39, wherein determining if the row was relocated, further comprising:
    code to analyze an operation code in the at least one log record;
    code to determine if the row has a clustered key;
    code to save the value of the clustered key; and
    code to analyze a set of log records to determine what modification each log record made and if a clustered key in each log record matches the saved clustered key.

42. The computer-executable process steps of claim 39, wherein determining if the row was relocated further comprises:
    code to analyze an operation code in the at least one log record; and
    code to determine if the row has a forward pointer.

43. The computer-executable process steps of claim 37, 38, 40, 41, or 42, wherein the database is a SQL Server database.

44. The computer-executable process steps of claim 39, wherein the database is a SQL Server database.

45. An apparatus for configuring a computerized database restoration system wherein the restoration is performed by executing a rollback script, apparatus comprising:
    memory means which stores one or more computer-executable process steps; and
    a processor which executes the process steps so as to:
        choose at least one selection criterion for use in determining if a transaction in a transaction log should be rolled back;
        determine an end of a time range for use in terminating searching of the transaction log,
        search the transaction log to find at least one log record that satisfies the at least one selection criterion, wherein the at least one log record contains an operation that is part of a committed transaction;
        extract the at least one log record from the transaction log;
        compute a command for use in rolling back the operation contained in the at least one log record; and
        write the command to a rollback script.

46. The apparatus of claim 45, wherein the at least one selection criterion is selected from the group consisting of SPID List, Table List, Activity Type, Time Range, and Logical Row Locator, wherein Logical Row Locator is a specific row within a table described by a standard SQL language.

47. The apparatus of claim 45, wherein the processor further executes steps so as to:
    issue a checkpoint command; and
    read a log sequence number of a last checkpoint command from a database boot record.

48. The apparatus of claim 46, wherein the processor further executes steps so as to:
    use the at least one selection criteria to determine the end of the time range.

49. The apparatus of claim 45, wherein the processor further executes steps so as to:
    accumulate changes needed to rollback each effected row of a table.

50. The apparatus of claim 49, wherein the processor further executes steps so that the transaction is an Insert.

51. The apparatus of claim 50, wherein the processor further executes steps so as to:
    determine if a row affected by the operation in an input log record was subsequently deleted in the database; and
    determine that no change is needed to rollback the transaction if the row affected by the operation in the input log record was subsequently deleted in the database.

52. The apparatus of claim 50, wherein the processor further executes steps so as to:
    determine if a row affected by the operation in an input log record was subsequently deleted in the database;
    maintain a temporary table that contains row images as they existed at various time points;
    remove all rows from the table, except for rows of type "B," whose Physical Row Id and Table Id match the input log record's Physical Row Id and Object Id;
    read a data row directly from a physical database page identified by the Physical Row Id in the input log record;
    create a new row in the table of type "D" and Physical Row Id equal to the input log record's Physical Row Id and DataRow equal to the data row read directly from the physical database page identified by the Physical Row Id in the input log record; and
    create a new row in the table of type "B", and Physical Row Id equal to the input log record's Physical Row Id and DataRow equal to the data row read directly from the physical database page identified by the Physical Row Id in the input log record.

53. The apparatus of claim 49, wherein the processor further executes steps so that the transaction is a Delete.

54. The apparatus of claim 53, wherein the processor further executes steps so as to:
- remove all rows whose Physical Row Id and Table Id match the input log record's Physical Row Id and Object Id, except those of type "B"; and
- create a new row in the table of type "I" and Physical Row Id equal to a physical row id of the input log record and DataRow equal to a data row of the input log record.

55. The apparatus of claim 49, wherein the processor further executes steps so that the transaction is a Modify.

56. The apparatus of claim 55, wherein the processor further executes steps so as to:
- determine if the table contains a row with the same Row Id as an input log record; and
- use the row with the same Row Id to perform the Modify transaction.

57. The apparatus of claim 45, wherein the at least one selection criterion is Time Range and searching the transaction log comprises using binary search techniques.

58. The apparatus of claims 45, 46, 47, 48, 49, 50, 51, 52, 53, 54, 55, 56, or 57, wherein the database is a SQL Server database.

59. An apparatus for determining the contents of a row in a database at any point in time wherein, apparatus comprising:
- memory means which stores one or more computer-executable process steps; and
- a processor which executes the process steps so as to:
  - determine an LSN for the row;
  - search a transaction log using the LSN in order to identify at least one log record that performed a transaction on the row; and
  - filter the at least one log record to determine if the transaction was committed.

60. The apparatus of claim 59, wherein the processor further executes steps so as to search in reverse chronological order.

61. The apparatus of claim 59 or 60, wherein the processor further executes steps so as to:
- determine if the row was relocated to a different physical page.

62. The apparatus of claim 61, wherein the processor further executes steps so as to:
- determine if the row was relocated with a pseudo-delete mechanism.

63. The apparatus of claim 61, wherein the processor further executes steps so as to:
- analyze an operation code in the at least one log record;
- determine if the row has a clustered key;
- save the value of the clustered key; and
- analyze a set of log records to determine what modification each log record made and if a clustered key in each log record matches the saved clustered key.

64. The apparatus of claim 61, wherein the processor further executes steps so as to:
- analyze an operation code in the at least one log record; and
- determine if the row has a forward pointer.

65. The apparatus of claim 59, 60, 62, 63, or 64, wherein the database is a SQL Server database.

66. The apparatus of claim 61, wherein the database is a SQL Server database.

* * * * *